(12) United States Patent
Lin et al.

(10) Patent No.: US 10,581,357 B2
(45) Date of Patent: Mar. 3, 2020

(54) ROTATING DIRECT CURRENT POWER SUPPLY FOR SYNCHRONOUS MACHINES

(71) Applicant: ABB Schweiz AG, Baden (CH)

(72) Inventors: Chenjie Lin, Fuquay Varina, NC (US); Ghanshyam Shrestha, Cary, NC (US); Mehanathan Pathmanathan, Västerås (SE); Pedro Rodriguez, Västerås (SE); Pasi Paloheimo, Vantaa (FI); Tuomas Janhunen, Vantaa (FI); Susanna Bäckström-Andersson, Helsinki (FI); Eino Silander, Klaukkala (FI)

(73) Assignee: ABB Schweiz AG, Baden (CH)

( * ) Notice: Subject to any disclaimer, the term of this patent is extended or adjusted under 35 U.S.C. 154(b) by 19 days.

(21) Appl. No.: 15/977,286

(22) Filed: May 11, 2018

(65) Prior Publication Data

US 2019/0348936 A1     Nov. 14, 2019

(51) Int. Cl.
*H02P 9/30*     (2006.01)
*H02P 9/02*     (2006.01)
(Continued)

(52) U.S. Cl.
CPC ............ *H02P 9/302* (2013.01); *H02K 19/26* (2013.01); *H02P 9/02* (2013.01); *H02P 9/305* (2013.01); *H02P 25/03* (2016.02); *H02P 9/102* (2013.01)

(58) Field of Classification Search
CPC .. H02P 9/02; H02P 9/305; H02P 25/03; H02P 9/302; H02K 19/26
See application file for complete search history.

(56) References Cited

U.S. PATENT DOCUMENTS

| 3,671,850 A | 6/1972 | Mehnert et al. |
| 3,967,173 A | 6/1976 | Stich |

(Continued)

FOREIGN PATENT DOCUMENTS

| AT | 513480 B1 | 10/2014 |
| EP | 0258760 B1 | 6/1994 |
| WO | 2016080889 A1 | 5/2016 |

OTHER PUBLICATIONS

Voith, "Maintenance Free Exciter," available at http://voith.com/corp-en/t3383_Maintenance_Free_Exciter_screen.pdf, last accessed Mar. 28, 2018, 12 pages.

(Continued)

*Primary Examiner* — Sean Gugger
(74) *Attorney, Agent, or Firm* — J. Bruce Schelkopf; Taft Stettinius & Hollister LLP

(57) ABSTRACT

Unique systems, methods, techniques and apparatuses of a rotating DC power supply are disclosed. One exemplary embodiment includes a first and second DC bus rail, a first and second leg, and a discharge resistor. The first leg includes a first semiconductor device and a second semiconductor device coupled in series at a first midpoint connection, the first semiconductor device being coupled to a first point on the first DC bus rail and the first midpoint connection being coupled to a field winding. The second leg includes a third semiconductor device and a fourth semiconductor device coupled in series at a second midpoint connection, the third semiconductor device being coupled to a second point on the first DC bus rail and the second midpoint connection being coupled to the field winding. The discharge resistor is operatively coupled to the first DC bus rail between the first point and the second point.

16 Claims, 5 Drawing Sheets

(51) Int. Cl.
*H02K 19/26* (2006.01)
*H02P 25/03* (2016.01)
*H02P 9/10* (2006.01)

(56) References Cited

U.S. PATENT DOCUMENTS

| | | | |
|---|---|---|---|
| 3,984,754 A | 10/1976 | Lapaev et al. | |
| 4,659,973 A | 4/1987 | Stith | |
| 8,258,760 B2 | 9/2012 | Crane | |
| 8,773,080 B2 | 7/2014 | Albsmeier | |
| 8,860,383 B2 | 10/2014 | Krause | |
| 8,912,765 B2 | 12/2014 | Rozman et al. | |
| 9,018,888 B2 | 4/2015 | Liu et al. | |
| 9,054,610 B2 | 6/2015 | Rozman et al. | |
| 9,118,271 B2* | 8/2015 | Elantably | H02P 9/10 |
| 2010/0253256 A1 | 10/2010 | Dokter et al. | |
| 2010/0256782 A1* | 10/2010 | Dai | H02P 6/14 700/14 |
| 2011/0018521 A1 | 1/2011 | Jonsson et al. | |
| 2011/0037422 A1* | 2/2011 | Pollock | H02P 6/10 318/400.34 |
| 2012/0007428 A1* | 1/2012 | Rozman | H02J 3/36 307/66 |
| 2012/0268082 A1* | 10/2012 | Krause | H02P 9/12 322/59 |
| 2014/0265744 A1* | 9/2014 | Rozman | H02P 9/48 310/68 D |
| 2014/0266076 A1* | 9/2014 | Rozman | H02P 9/02 322/24 |
| 2014/0266078 A1* | 9/2014 | Rozman | H02P 9/02 322/27 |
| 2014/0266080 A1 | 9/2014 | Silander | |
| 2014/0375281 A1 | 12/2014 | Hurley et al. | |
| 2015/0340966 A1* | 11/2015 | Mutsuura | H02M 7/003 363/98 |
| 2016/0261220 A1 | 9/2016 | Kuroiwa | |
| 2016/0268942 A1* | 9/2016 | Rozman | H02K 11/33 |
| 2018/0198395 A1* | 7/2018 | Gieras | H02P 9/32 |

OTHER PUBLICATIONS

C. Lin et al., "Design considerations for reduction of acoustic noise in switched reluctance drives," IEEE Energy Conversion Congress and Exposition (ECCE), dated Nov. 13, 2014, pp. 14-18, IEEE, Pittsburgh, USA.

C. A. Platero et al., "High-speed de-excitation system for brushless synchronous machines," IET Electric Power Applications, dated Mar. 15, 2012, pp. 156-161, vol. 6, No. 3, Institution of Engineering and Technology.

R. C. Schaefer, "Application of static excitation systems for rotating exciter replacement," Pulp and Paper Industry Technical Conference, dated Aug. 6, 2002, pp. 199-208, IEEE, Cincinnati, USA.

Patent Cooperation Treaty, International Search Report and Written Opinion in corresponding application No. PCT/2019/031976, dated Aug. 2, 2019, 7 pp.

* cited by examiner

ROTATING DIRECT CURRENT POWER SUPPLY FOR SYNCHRONOUS MACHINES

BACKGROUND

The present disclosure relates generally to brushless synchronous machines with a DC power supply incorporated with the rotor. In conventional brushless synchronous machines, a DC power supply provides an excitation current to a rotor field winding, the excitation current having characteristics controllable by an external exciter unit, an external automatic voltage regulator, or a DC current regulator within the DC power supply, to name but a few examples. Existing DC power supplies suffer from a number of shortcomings and disadvantages. There remain unmet needs such as reducing machine noise or vibration, increasing machine responsiveness to fault events or shut down events, reducing DC power supply complexity, and increasing DC power supply reliability. For instance, delayed field winding de-excitation during faults or shut down events increase the risk of damage to synchronous machine components such as the DC power supply. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for rotating DC power supplies in synchronous machines. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
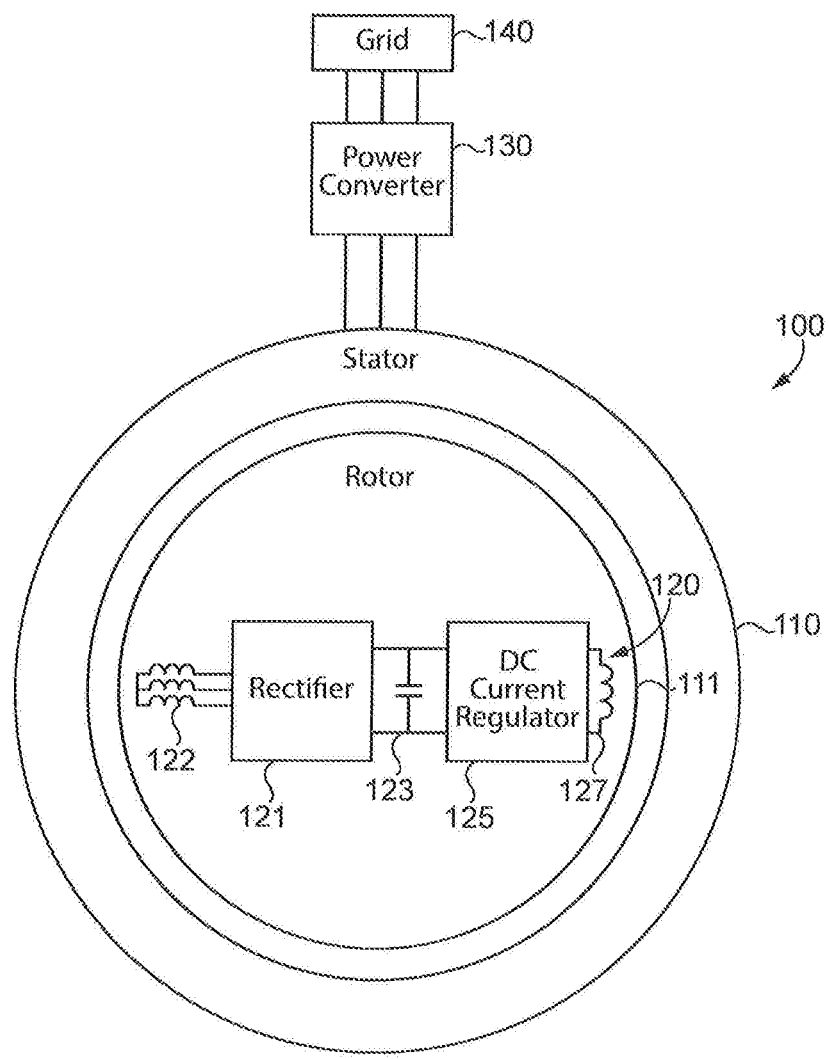
FIG. 1 is a schematic diagram illustrating an exemplary synchronous machine.

With reference to FIG. 1, there is illustrated a synchronous machine 100 including an exemplary rotating direct current (DC) power supply 120. It shall be appreciated that machine 100 may be implemented as any type of brushless synchronous machine with any stator or rotor topology, and machine 100 may be operated as a motor or a generator.

Synchronous machine 100 includes a stator 110 coupled to a utility grid 140 by way of a power converter 130. Utility grid 140 is structured to transmit alternating current (AC) power to power converter 130. Utility grid 140 may also receive AC power from power converter 130, such AC power including the first voltage and frequency. In certain embodiments, utility grid 140 may be replaced by another type of power distribution network or a load. In certain embodiments, machine 100 may not be coupled to a power converter and may instead be coupled to utility grid 140.

Power converter 130 may be structured to receive AC power from utility grid 140, convert the AC power to a second AC power including a second voltage and second frequency, and output the second AC power to stator 110. Power converter 130 may also be structured to receive power from stator 110. The AC power transmitted between stator 110 and power converter 130 may have a different voltage or frequency compared to the AC power transmitted between utility grid 140 and power converter 130 due to operation of converter 130.

Synchronous machine 100 includes a rotor 111 which includes rotating DC power supply 120 coupled to input windings 122 and a field winding 127. DC power supply 120 includes a rectifier 121, a DC link 123, and a DC current regulator 125. DC power supply 120 is structured to receive AC power from input windings 122, convert the AC power into DC power, and output the DC power to field winding 127, as explained in more detail below.

In certain embodiments, input windings 122 receive multiphase AC power from the stator windings of stator 110. Input windings 122 may also be windings of a transformer and structured to receive AC power from an external exciter unit. In certain embodiments, rotor 111 may include a single input winding structured to receive single phase power from stator 110. It shall be appreciated that any or all of the foregoing components and features of synchronous machine 100 may also be present in the other synchronous machines disclosed herein.

Figure 2:
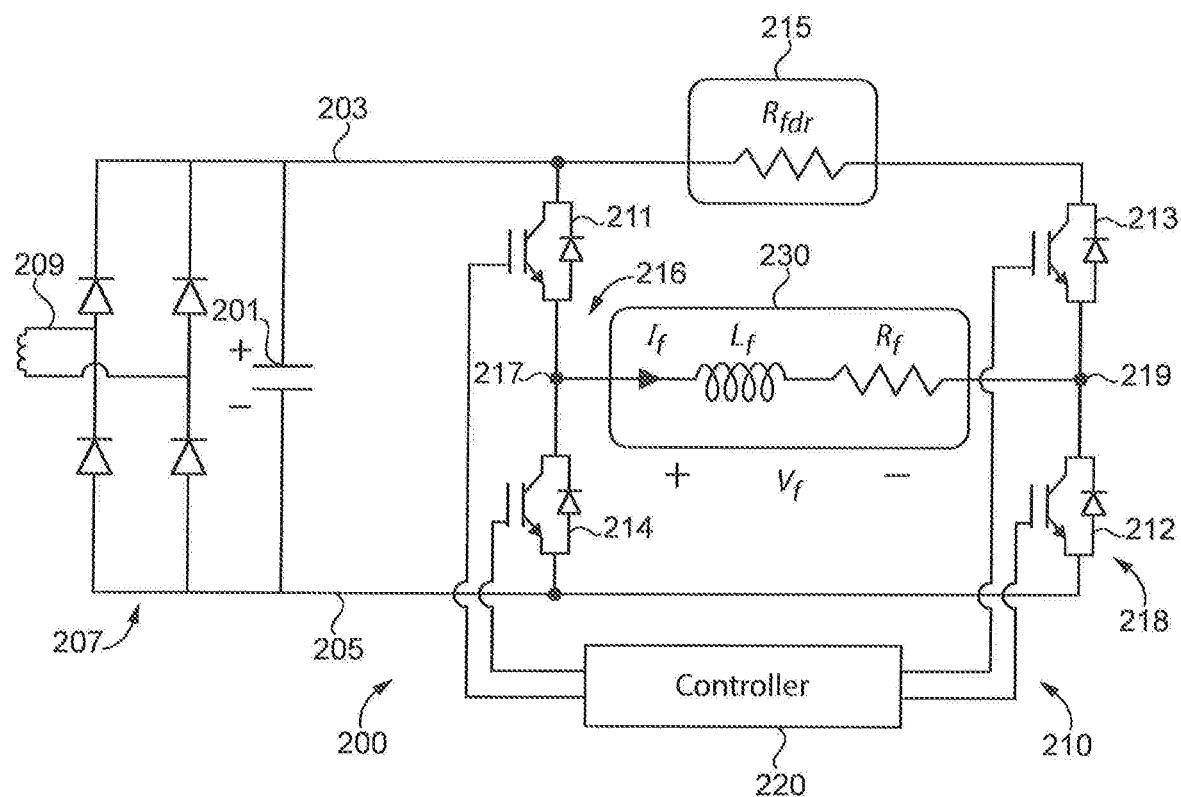
FIG. 2 is a circuit diagram illustrating an exemplary rotating DC power supply.

With reference to FIG. 2, there is illustrated an exemplary rotating DC power supply 200 coupled to an input winding 209 and a field winding 230. Power supply 200 is structured to receive AC power from input winding 209 and output DC power to field winding 230. Power supply 200 includes a rectifier 207, a DC link 201, and a DC current regulator 210, all coupled between DC bus rails 203 and 205. In certain embodiments, each DC bus rail may be a single terminal, a plurality of coupled terminals, or a line.

Input winding 209 may be a winding of a transformer structured to receive power from an external exciter unit, or input winding 209 may be an exciter winding structured to receive AC power from stator 110. Input winding 209 is coupled to rectifier 207. In the illustrated embodiment, rectifier 207 is a passive rectifier comprised of diodes arranged so as to convert the AC power received from winding 209 to DC power without receiving control signals. Rectifier 207 is coupled to DC bus rails 203 and 205. Rectifier 207 is structured to output DC power to DC bus rails 203 and 205. DC bus rail 203 is coupled to rectifier 207 so as to receive positive pole DC power, and DC bus rail 205 is coupled to rectifier 207 so as to receive negative pole DC power. In other embodiments, rectifier 207 may be an active rectifier structured to convert AC power received from winding 209 to DC power by operating a plurality of switching devices using control signals.

DC link 201 includes a capacitor structured to receive DC power from rectifier 207, store the DC power, output stored DC power to DC current regulator 210, and receive DC power from DC current regulator 210. In certain embodiments, DC link 201 may include a plurality of capacitors, an ultracapacitor, or a battery, to name but a few examples.

DC current regulator 210 includes an H-bridge, also known as a full bridge, semiconductor device arrangement coupled to DC bus rail 203, DC bus rail 205, and field winding 230. DC current regulator 210 includes a first leg 216 and a second leg 218 coupled between DC bus rails 203 and 205.

Leg 216 includes a first semiconductor device 211 and a second semiconductor device 214 coupled in series at a midpoint connection 217. Semiconductor device 211 includes a first terminal coupled to DC bus rail 203 and a second terminal coupled to midpoint connection 217. Semiconductor device 214 includes a first terminal coupled to midpoint connection 217 and a second terminal coupled to DC bus rail 205.

Leg 218 includes a first semiconductor device 213 and a second semiconductor device 212 coupled in series at a midpoint connection 219. Semiconductor device 213 includes a first terminal coupled to DC bus rail 203 and a second terminal coupled to midpoint connection 219. Semiconductor device 212 includes a first terminal coupled to midpoint connection 219 and a second terminal coupled to DC bus rail 205.

In the illustrated embodiment, semiconductor devices 211-214 are insulated gate bipolar transistors (IGBTs) electrically coupled in an anti-parallel formation with a freewheeling diode. In other embodiments, semiconductor devices 211-214 may include bipolar junction transistors (BJTs), metal-oxide semiconductor field-effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switch structured to selectively control the flow of electric current, so long as any switching device without an intrinsic body diode is coupled in an anti-parallel configuration with a freewheeling diode. In certain embodiments, semiconductor devices 213 and 214 may be diodes such that the flow of current through semiconductor devices 213 and 214 is not controlled by control signals.

Field winding 230 is coupled between midpoint connection 217 and midpoint connection 219. Field winding 230 has an inductive value $L_f$ measured in henries and a resistive value $R_f$ measured in ohms. A current with magnitude $I_f$ flows through field winding 230 in the direction noted by the arrow during operation of DC current regulator 210.

DC current regulator 210 includes a discharge resistor 215 operatively coupled to DC bus rail 203 between the point on DC bus rail 203 where the first terminal of semiconductor device 211 is coupled to DC bus rail 203 and the point on DC bus rail 203 where the first terminal of semiconductor device 213 is coupled to DC bus rail 203. It shall be appreciated that the discharge resistor 215 is not merely the resistance of DC bus rail 203. Rather, discharge resistor 215 is a distinct element operatively coupled to DC bus rail 203. In certain embodiments, discharge resistor 215 may instead be operatively coupled to DC bus rail 205 between the point where the second terminal of semiconductor device 214 is coupled to DC bus rail 205 and the point on DC bus rail 205 where the second terminal of semiconductor device 212 is coupled to DC bus rail 205.

Discharge resistor 215 includes a resistance value $R_{fdr}$ which can be measured in ohms. In certain embodiments, the resistance value $R_{fdr}$ of discharge resistor 215 is greater than the resistance value $R_f$ of field winding 230. In certain embodiments, the ratio of $R_{fdr}:R_f$ is 4:1.

DC current regulator 210 is controlled by a controller 220. In certain embodiments, controller 220 is incorporated into the rotor in its entirety. In other embodiments, a portion of controller 220 is incorporated into the rotor and another portion of controller 220 is located outside the rotor, but structured to communicate with the other portion of controller 220 using a wired or wireless communication channel.

In the illustrated embodiment, controller 220 is coupled to semiconductor devices 211-214. In other embodiments, controller 220 is only coupled to semiconductor devices 211 and 212 or semiconductor devices 213 and 214. Controller 220 is structured to operate the semiconductor devices of DC current regulator 210 by transmitting control signals to each semiconductor device. Each semiconductor device is structured to be opened, blocking the flow of current through the switch of the semiconductor device, or closed, allowing the flow of current to pass through the switch of the semiconductor device. Controller 220 may include sensors or other devices structured to observe or measure electrical characteristics of power supply 200, such as current $I_f$ or voltage $V_f$.

As explained in more detail below, controller 220 is structured to operate the semiconductor switches of DC current regulator 210 so as to regulate current flowing to field winding 230 during nominal operation mode, reduce current flowing to field winding 230 during a de-excitation mode, and reduce current flowing to field winding 230 during a fault response mode. It shall be appreciated that any or all of the foregoing components and features of rotating DC power supply 200 may also be present in the other rotating DC power supplies disclosed herein.

Figure 3A:
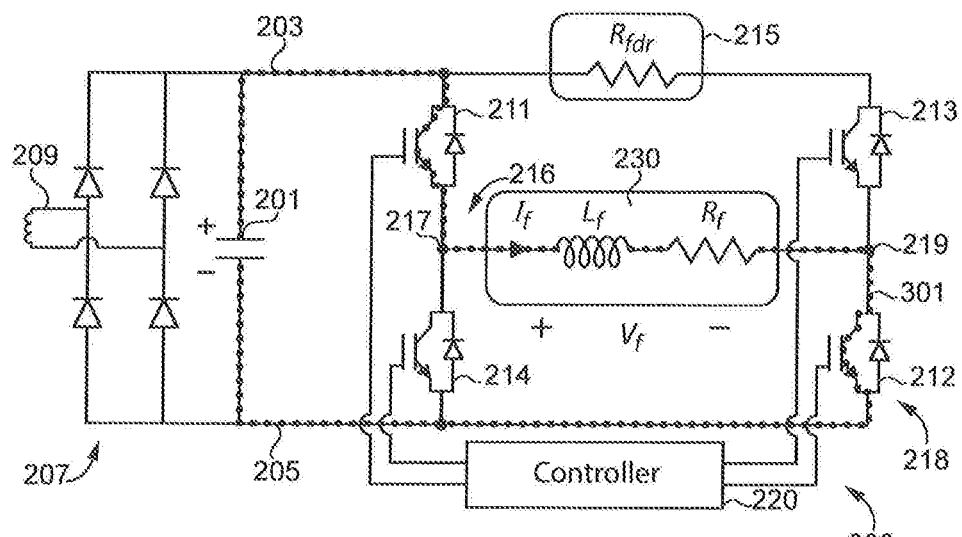
FIGS. 3A-3B are circuit diagrams illustrating current flowing through the exemplary rotating DC power supply in FIG. 2 during nominal operation mode.
Figure 3B:
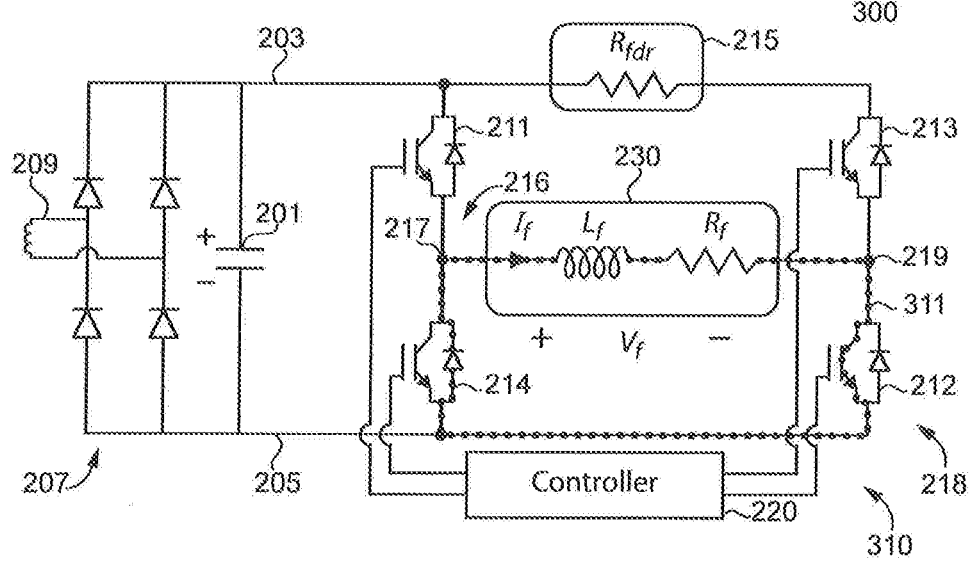
Figure 3C:
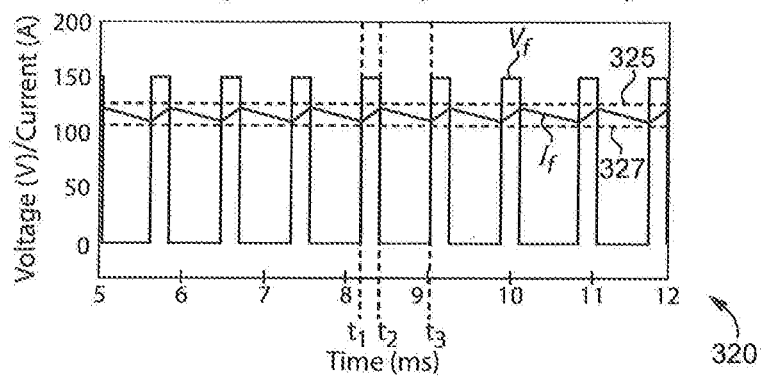
FIG. 3C is a graph illustrating electrical characteristics of the exemplary rotating DC power supply in FIG. 2 during nominal operation mode.

With reference to FIGS. 3A-3C, there is illustrated nominal operation mode of the exemplary rotating DC power supply 200 in FIG. 2. FIG. 3A illustrates a switching configuration 300 in which the switches of semiconductor devices 211 and 212 are closed and the switches of semiconductor devices 213 and 214 are open. Current $I_f$ flows in a current path 301 through DC link 201, the switch of semiconductor device 211, field winding 230, and the switch of semiconductor device 212.

FIG. 3B illustrates a switching configuration 310 in which the switches of semiconductor devices 211, 214, and 213 are open and the switch of semiconductor device 212 is closed. Current $I_f$ flows in a current path 311 through field winding 230, the switch of semiconductor device 212, and the diode of semiconductor device 214.

FIG. 3C is a graph 320 illustrating electrical characteristics of power supply 200 while in nominal operation mode. During nominal operation mode, controller 220 controls the semiconductor devices of DC current regulator 210 so as to transition between configuration 300 in FIG. 3A and configuration 310 in FIG. 3B. Graph 320 includes voltage $V_f$, current $I_f$, a line representing a minimum current threshold 327, and a line representing a maximum current threshold 325.

At time $t_1$, controller 220 transitions DC current regulator 210 to switching configuration 300 in response to determining current $I_f$ is equal to or less than minimum current threshold 327. As a result of the switching configuration 300, voltage $V_f$ applied to field winding 230 increases to the voltage across DC link 201 and current $I_f$ increases. At time $t_2$, controller 220 transitions to switching configuration 310 in response to determining current $I_f$ is equal to or greater than maximum current threshold 325. As a result of the transition to switching configuration 310, voltage $V_f$ applied to field winding 230 decreases to zero and current $I_f$ decreases. At time $t_3$, current $I_f$ returns to the same magnitude as time $t_1$, and controller 220 once again transitions to switching configuration 300. Thresholds 325 and 327 are determined based on a desired average field winding current. In other embodiments, controller 220 may operate DC current regulator 210 using another control strategy in order to transition between switching configuration 300 and switching configuration 310. For example, controller 220 may operate DC current regulator 210 in response to comparing current $I_f$ to a single current threshold value or comparing $I_f$ to a reference point. In certain embodiments, controller 220 operates DC current regulator 210 using a PID control strategy or PWM control strategy.

The exemplary nominal operation mode of DC current regulator 210, as illustrated in FIGS. 3A-C, is effective to cause acoustic noise reduction compared to conventional operation of an H-bridge converter in which pairs of semiconductor switches, including one switch from each leg, are toggled in an alternating manner. The exemplary nominal operation mode is also effective to cause acoustic noise reduction compared to conventional operation of an asymmetric bridge converter. The exemplary nominal operation mode of DC current regulator 210 also differs from conventional operation of an H-bridge converter or asymmetric bridge converter in order to reduce power losses of DC power supply 200 by avoiding passing current through discharge resistor 215.

Figure 4A:
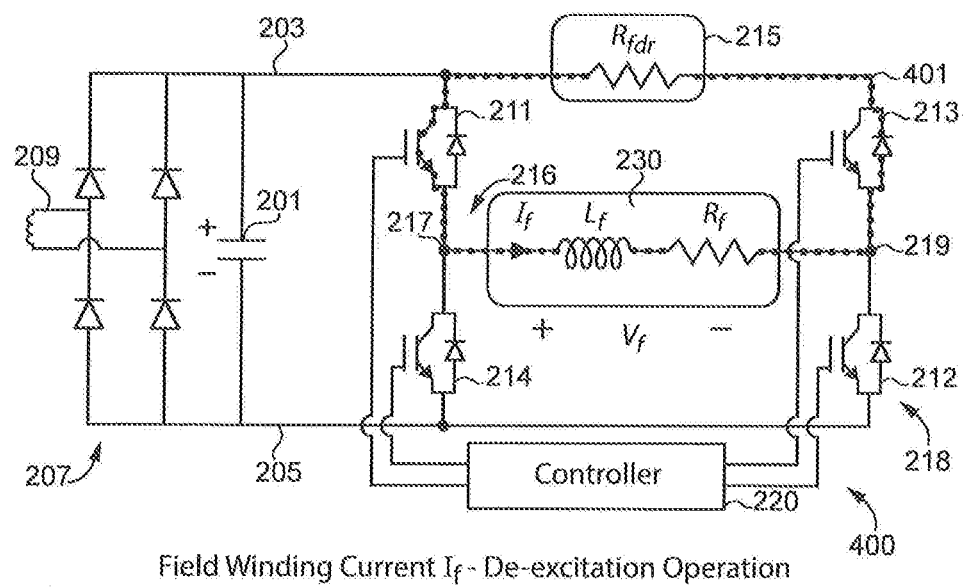
FIG. 4A is a circuit diagram illustrating current flowing through the exemplary rotating DC power supply in FIG. 2 during de-excitation mode.
Figure 4B:
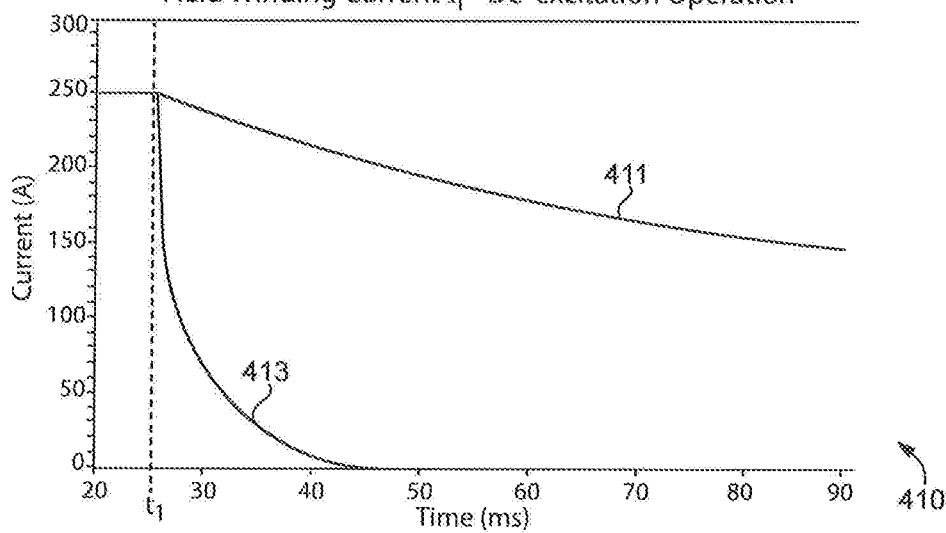
FIG. 4B is a graph illustrating electrical characteristics of the exemplary rotating DC power supply in FIG. 2 during de-excitation mode.
Figure 4C:
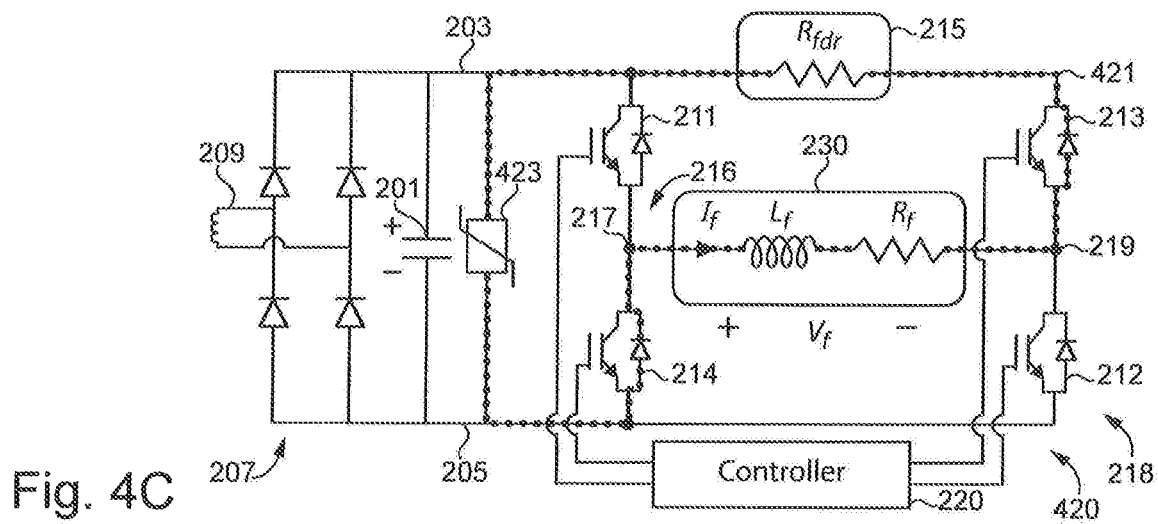
FIG. 4C is a circuit diagram illustrating current flowing through another exemplary rotating DC power supply during de-excitation mode.

With reference to FIGS. 4A-4C, there is illustrated a de-excitation mode of the exemplary rotating DC power supply 200 in FIG. 2. FIG. 4A illustrates a switching configuration 400 in which the switch of semiconductor device 211 is closed and the switches of semiconductor devices 212, 213, and 214 are open. Current $I_f$ flows in a current path 401 through the switch of semiconductor device 211, field winding 230, the diode of semiconductor device 213, and discharge resistor 215.

FIG. 4B is a graph 410 illustrating electrical characteristics of power supply 200 while in de-excitation mode. During the de-excitation operation, controller 220 must quickly eliminate the excitation current flowing through field winding 230 as part of shutting down the synchronous machine. Controller 220 controls the semiconductor devices of DC current regulator 210 so as to transition to switching configuration 400. Graph 410 includes a line 411 representing current $I_f$ in one embodiment of power supply 200 in which the resistance value $R_{fdr}$ of discharge resistor 215 is 2 ohms. Graph 410 includes a line 413 representing current $I_f$ in one embodiment of power supply 200 in which the resistance value $R_{fdr}$ of discharge resistor 215 is 200 ohms. The resistance value of the discharge resistor is determined by a desired rate of de-excitation rate and thermal management constraints, among other considerations.

At time $t_1$, controller 220 transitions DC current regulator 210 to switching configuration 400 in response to determining the synchronous machine should be shut down. Controller 220 may determine the synchronous machine should be shut down by receiving a command or using measurements of electrical characteristics of power supply 200, to name but a few examples. As a result of switching configuration 400, current $I_f$ quickly reduces to zero by using discharge resistor 215 to consume the remaining inductive energy in field winding 230. In certain embodiments, controller 220 may transition DC current regulator 210 to switching configuration 400 in response to a command to quickly decrease current $I_f$ in a situation other than a synchronous machine shut down.

FIG. 4C illustrates a switching configuration 420 and a modification to rotating DC power supply 200 in which DC current regulator 210 includes a metal oxide varistor (MOV) 423 coupled across DC bus rail 203 and DC bus rail 205 between DC link 201 and leg 216. In switching configuration 420, each switch of all semiconductor devices of DC current regulator 210 are open. Current $I_f$ flows in a current path 421 through MOV 423, the diode of semiconductor device 214, field winding 230, the diode of semiconductor device 213, and discharge resistor 215.

Figure 5A:
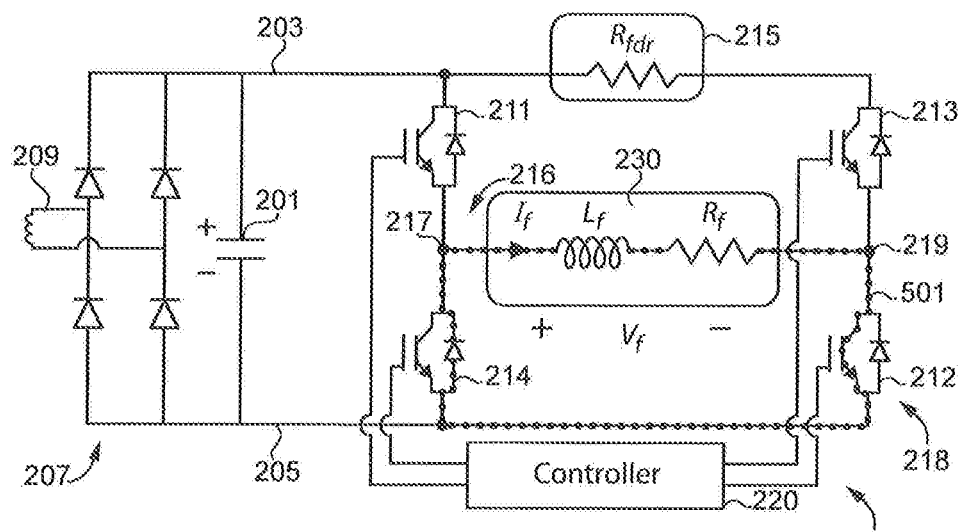
FIGS. 5A-5B are circuit diagrams illustrating current flowing through the exemplary rotating DC power supply in FIG. 2 during fault response mode.
Figure 5B:
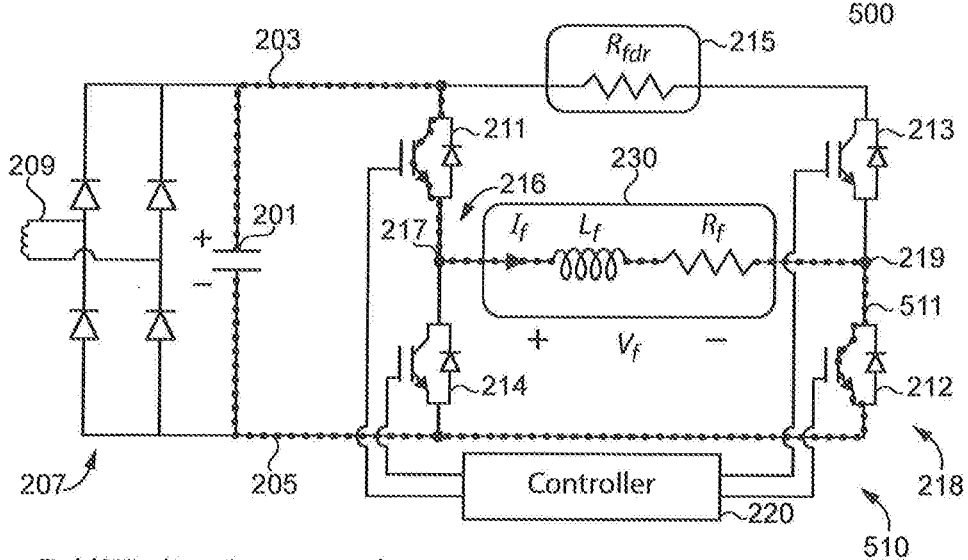
Figure 5C:
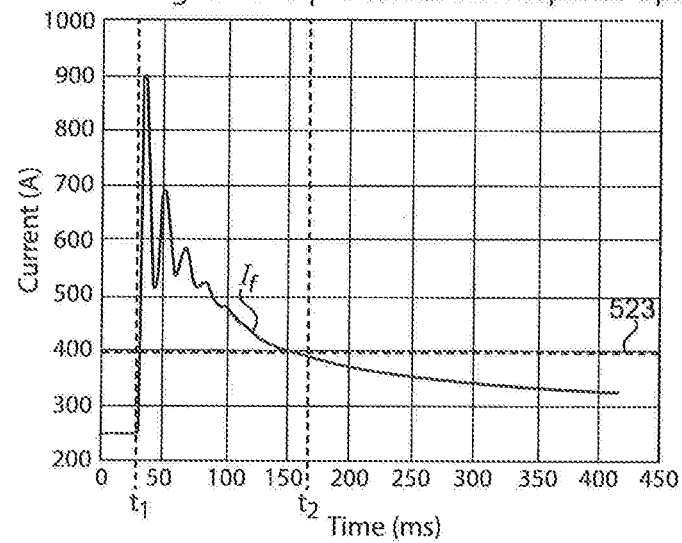
FIG. 5C is a graph illustrating electrical characteristics of the exemplary rotating DC power supply in FIG. 2 during fault response mode.

With reference to FIGS. 5A-5C, there is illustrated a fault response mode of the exemplary rotating DC power supply 200 in FIG. 2. FIG. 5A illustrates a switching configuration 500 in which the switch of semiconductor device 212 is closed and the switches of semiconductor devices 211, 213, and 214 are open. Current $I_f$ flows in a current path 501 through field winding 230, the switch of semiconductor device 212, and the diode of semiconductor device 214. In another embodiment, switching configuration 500 is modified by closing the switch of semiconductor device 211 and opening the switch of semiconductor device 212 such that current $I_f$ flows in a current path through field winding 230, the diode of semiconductor device 213, discharge resistor 215, and the switch of semiconductor device 211.

FIG. 5B illustrates a switching configuration 510 in which the switches of semiconductor devices 211 and 212 are closed and the switches of semiconductor devices 213 and 214 are open. Current $I_f$ flows in a current path 501 through DC link 201, the switch of semiconductor device 211, field winding 230, and the switch of semiconductor device 212.

FIG. 5C is a graph 520 illustrating electrical characteristics of power supply 200 during fault response mode where controller 220 controls semiconductor devices of DC current regulator 210 so as to enter configuration 500 in FIG. 5A, followed by configuration 510 in FIG. 5B. Graph 520 includes a line representing current and a line representing a current threshold 523.

At time $t_1$, controller 220 enters fault response mode in response to determining a fault is occurring. In certain embodiments, the fault may be located within the stator of the synchronous machine, a power converter coupled to the synchronous machine, or the utility grid coupled to the power converter or synchronous machine. The fault may be any type of transient or intermittent fault, such as a three phase short circuit fault in the utility grid. In response to entering fault response mode, controller 220 transitions DC current regulator 210 to switching configuration 500. As a result of switching configuration 500, current $I_f$ begins to decrease. At time $t_2$, controller 220 transitions DC current regulator 210 from switching configuration 500 to switching configuration 510 in response to determining current $I_f$ is equal to or less than current threshold 523. Current $I_f$ continues to decrease. It is important to note switching configuration 510 of fault response mode is the same as switching configuration 300 of nominal operation mode. Once current $I_f$ is equal to or less than maximum current threshold 325 in FIG. 3C, controller 220 may exit fault response mode and enter nominal operation mode.

Further written description of a number of exemplary embodiments shall now be provided. One embodiment is a rotating DC power supply structured to be coupled to a field winding comprising: a first DC bus rail; a second DC bus rail; a first leg including a first semiconductor device and a second semiconductor device coupled in series at a first midpoint connection, the first semiconductor device being coupled to a first point on the first DC bus rail, the second semiconductor device being coupled to the second DC bus rail, and the first midpoint connection being coupled to the field winding; a second leg including a third semiconductor device and a fourth semiconductor device coupled in series at a second midpoint connection, the third semiconductor device being coupled to a second point on the first DC bus rail, the fourth semiconductor device being coupled to the second DC bus rail, and the second midpoint connection being coupled to the field winding; and a discharge resistor operatively coupled to the first DC bus rail between the first point and the second point.

In certain forms of the foregoing rotating DC power supply, the first semiconductor device and the fourth semiconductor device are structured to be operated by a controller in a nominal operation mode so as to close the fourth semiconductor device while repeatedly opening and closing the first semiconductor device. In certain forms, the first semiconductor device includes a semiconductor switch, the fourth semiconductor device includes a semiconductor switch, the second semiconductor device is a diode, and the third semiconductor device is a diode. In certain forms, the controller is structured to operate the first semiconductor device and the fourth semiconductor device in a de-excitation mode by closing the first semiconductor device and opening the fourth semiconductor device such that an electric current flows through the first semiconductor device, the field winding, the third semiconductor device, and the discharge resistor. In certain forms, the controller is structured to operate the first semiconductor device and the fourth semiconductor device in a fault response mode by opening the first semiconductor device and closing the fourth semiconductor device in response to detecting a fault. In certain forms, the rotating DC power supply is incorporated into a rotor of a synchronous machine which includes a stator coupled to a utility grid, and wherein the fault is a short-circuit fault located within a stator of the synchronous machine or the utility grid. In certain forms, the rotating DC power supply comprises a metal oxide varistor (MOV) coupled between the first DC bus rail and the second DC bus rail, and wherein the controller is structured to operate the first semiconductor device and the fourth semiconductor device in a de-excitation mode by opening the first semiconductor device and opening the fourth semiconductor device such that an electric current flows through the second semiconductor device, the field winding, the third semiconductor device, the discharge resistor, and the MOV.

Another exemplary embodiment is a synchronous machine comprising: a rotor including: a rotating DC power supply including: a first DC bus rail, a second DC bus rail, a first leg coupled to the first DC bus rail and the second DC bus rail, the first leg including a first semiconductor device and a first diode coupled in series at a first midpoint connection, a second leg coupled to the first DC bus rail and the second DC bus rail, the second leg including a second semiconductor device and a second diode coupled in series at a second midpoint connection, a discharge resistor operatively coupled to one of the first DC bus rail or the second DC bus rail between the first leg and the second leg, and a field winding coupled between the first midpoint connection and the second midpoint connection.

In certain forms of the foregoing synchronous machine, the machine comprises a first portion of a controller and a second portion of a controller structured to communicate with the first portion of the controller, wherein the first portion of the controller is located in the rotor and the second portion of the controller is located outside the rotor. In certain forms, the machine comprises a controller structured to operate the first semiconductor device and the second semiconductor device in a nominal operation mode by closing, the second semiconductor device while repeatedly toggling the first semiconductor device so as to maintain an average current through the field winding. In certain forms, the machine comprises a controller structured to operate the first semiconductor device and the second semiconductor device in a de-excitation mode by closing the first semiconductor device and opening the second semiconductor device such that an electric current flows through the discharge resistor and the second diode until the current flowing through the field winding reduces to zero. In certain forms, the machine comprises a controller structured to operate the first semiconductor device and the second semiconductor device in a fault response mode by opening the first semiconductor device and closing the second semiconductor device until a current flowing through the field winding is equal to or less than a current threshold value. In certain forms, the controller is structured to close the first semiconductor device in response to the current flowing through the field winding being equal to or less than the current threshold value. In certain embodiments, the controller is structured to enter the fault response mode in response to determining a transient fault is occurring. In certain embodiments, the rotating DC power supply includes a passive rectifier structured to receive AC power, convert the AC power to DC power, and provide the DC power to the first DC bus rail and the second DC bus rail.

A further exemplary embodiment is a method for operating a rotor of a synchronous machine including a rotating DC power supply, the method comprising: operating a rotating DC power supply including: a first DC bus rail, a second DC bus rail, a first leg coupled to the first DC bus rail and the second DC bus rail, the first leg including a first semiconductor device and a first diode coupled in series at a second midpoint connection, a second leg coupled to the first DC bus rail and the second DC bus rail, the second leg including a second semiconductor device and a second diode coupled in series at a midpoint connection, and a discharge resistor operatively coupled to one of the first DC bus rail or the second DC bus rail between the first leg and the second leg; and operating the rotating DC power supply in a nominal operation mode by closing the second semiconductor device while repeatedly toggling the first semiconductor device.

In certain forms of the foregoing method, the method comprises operating the DC power supply in a de-excitation mode by closing the first semiconductor device and opening the second semiconductor device such that a current flows through the discharge resistor and the second diode until the current flowing through the field winding reduces to zero. In certain forms, comprises a controller structured to operate the first semiconductor device and the second semiconductor device in a fault response mode by opening the first semiconductor device and closing the second semiconductor device until a current flowing through the field winding is equal to or less than a current threshold value. In certain forms, a ratio of the resistance of the discharge resistor to the resistance of the field winding is 4:1. In certain forms, the rotor includes an exciter winding structured to receive AC power from a stator and provide the AC power to the DC power supply.

It is contemplated that the various aspects, features, processes, and operations from the various embodiments may be used in any of the other embodiments unless expressly stated to the contrary. Certain operations illustrated may be implemented by a computer executing a computer program product on a non-transient, computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred," or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A rotating DC power supply structured to be coupled to a field winding comprising:
   a first DC bus rail;
   a second DC bus rail;
   a metal oxide varistor (MOV) coupled between the first DC bus rail and the second DC bus rail;
   a first leg including a first semiconductor device and a second semiconductor device coupled in series at a first midpoint connection, the first semiconductor device being coupled to a first point on the first DC bus rail, the second semiconductor device being coupled to the second DC bus rail, and the first midpoint connection being coupled to the field winding;
   a second leg including a third semiconductor device and a fourth semiconductor device coupled in series at a second midpoint connection, the third semiconductor device being coupled to a second point on the first DC bus rail, the fourth semiconductor device being coupled to the second DC bus rail, and the second midpoint connection being coupled to the field winding; and
   a discharge resistor operatively coupled to the first DC bus rail between the first point and the second point,
   wherein a controller is structured to operate the first semiconductor device and the fourth semiconductor device in a de-excitation mode by opening the first semiconductor device and opening the fourth semiconductor device such that an electric current flows through the second semiconductor device, the field winding, the third semiconductor device, the discharge resistor, and the MOV.

2. The rotating DC power supply of claim 1 wherein the first semiconductor device and the fourth semiconductor device are structured to be operated by a controller in a nominal operation mode so as to close the fourth semiconductor device while repeatedly opening and closing the first semiconductor device.

3. The rotating DC power supply of claim 2 wherein the first semiconductor device includes a semiconductor switch, the fourth semiconductor device includes a semiconductor switch, the second semiconductor device is a diode, and the third semiconductor device is a diode.

4. The rotating DC power supply of claim 2 wherein the controller is structured to operate the first semiconductor device and the fourth semiconductor device in a fault response mode by opening the first semiconductor device and closing the fourth semiconductor device in response to detecting a fault.

5. The rotating DC power supply of claim 4 wherein the rotating DC power supply is incorporated into a rotor of a synchronous machine, the synchronous machine including a stator coupled to a utility grid, and wherein the fault is a short-circuit fault located within the stator of the synchronous machine or the utility grid.

6. A synchronous machine comprising:
   a rotor including:
      a rotating DC power supply including:
         a first DC bus rail,
         a second DC bus rail,
         a first leg coupled to the first DC bus rail and the second DC bus rail, the first leg including a first semiconductor device and a first diode coupled in series at a first midpoint connection,
         a second leg coupled to the first DC bus rail and the second DC bus rail, the second leg including a second semiconductor device and a second diode coupled in series at a second midpoint connection,
         a discharge resistor operatively coupled to one of the first DC bus rail or the second DC bus rail between the first leg and the second leg;
      a field winding coupled between the first midpoint connection and the second midpoint connection; and
      a controller structured to operate the first semiconductor device and the second semiconductor device in a de-excitation mode by closing the first semiconductor device and opening the second semiconductor device such that an electric current flows through the discharge resistor and the second diode.

7. The synchronous machine of claim 6 wherein the controller comprises a first portion of the controller and a second portion of the controller structured to communicate with the first portion of the controller, wherein the first portion of the controller is located in the rotor and the second portion of the controller is located outside the rotor.

8. The synchronous machine of claim 6 wherein the controller is structured to operate the first semiconductor device and the second semiconductor device in a nominal operation mode by closing the second semiconductor device while repeatedly toggling the first semiconductor device so as to maintain an average current through the field winding.

9. The synchronous machine of claim 6 wherein the controller is structured to operate the first semiconductor device and the second semiconductor device in a fault response mode by opening the first semiconductor device and closing the second semiconductor device until a current flowing through the field winding is equal to or less than a current threshold value.

10. The synchronous machine of claim 9 wherein the controller is structured to close the first semiconductor device in response to the current flowing through the field winding being equal to or less than the current threshold value.

11. The synchronous machine of claim 9 wherein the controller is structured to enter the fault response mode in response to determining a transient fault is occurring.

12. The synchronous machine of claim 9 wherein the rotating DC power supply includes a passive rectifier structured to receive AC power, convert the AC power to DC power, and provide the DC power to the first DC bus rail and the second DC bus rail.

13. A method for operating a rotor of a synchronous machine including a rotating DC power supply coupled to a field winding, the method comprising:
operating the rotating DC power supply including:
a first DC bus rail,
a second DC bus rail,
a first leg coupled to the first DC bus rail and the second DC bus rail, the first leg including a first semiconductor device and a first diode coupled in series at a second midpoint connection,
a second leg coupled to the first DC bus rail and the second DC bus rail, the second leg including a second semiconductor device and a second diode coupled in series at a midpoint connection, and
a discharge resistor operatively coupled to one of the first DC bus rail or the second DC bus rail between the first leg and the second leg;
operating the rotating DC power supply in a nominal operation mode by closing the second semiconductor device while repeatedly toggling the first semiconductor device; and
operating the rotating DC power supply in a de-excitation mode by closing the first semiconductor device and opening the second semiconductor device such that a current flows through the discharge resistor and the second diode.

14. The method of claim 13 comprising a controller structured to operate the first semiconductor device and the second semiconductor device in a fault response mode by opening the first semiconductor device and closing the second semiconductor device until a current flowing through the field winding is equal to or less than a current threshold value.

15. The method of claim 13 wherein a ratio of the resistance of the discharge resistor to the resistance of the field winding is 4:1.

16. The method of claim 13 wherein the rotor includes an exciter winding structured to receive AC power from a stator and provide the AC power to the rotating DC power supply.

* * * * *